(12) United States Patent  (10) Patent No.: US 8,259,236 B2
Jin  (45) Date of Patent: Sep. 4, 2012

(54) IMAGE DISPLAY APPARATUS AND METHOD FOR PROVIDING XLET THEREOF

(75) Inventor: Kyoung-mi Jin, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1241 days.

(21) Appl. No.: 11/762,384

(22) Filed: Jun. 13, 2007

(65) Prior Publication Data

US 2008/0117340 A1  May 22, 2008

(30) Foreign Application Priority Data

Nov. 21, 2006 (KR) .................. 10-2006-0115294

(51) Int. Cl.
 *H04N 5/44* (2011.01)
(52) U.S. Cl. ........ 348/734; 348/134; 348/569; 348/563; 348/564; 348/552; 725/38; 715/716; 715/760; 715/200
(58) Field of Classification Search .................. 348/734, 348/569, 563, 564, 552; 725/38; 715/716, 715/760
See application file for complete search history.

(56) References Cited

U.S. PATENT DOCUMENTS

| | | | | |
|---|---|---|---|---|
| 6,501,516 | B1 * | 12/2002 | Clapper | 348/734 |
| 7,581,182 | B1 * | 8/2009 | Herz | 715/713 |
| 2002/0089427 | A1 | 7/2002 | Aratani et al. | |
| 2002/0129000 | A1 * | 9/2002 | Pillai et al. | 707/1 |
| 2003/0035074 | A1 * | 2/2003 | Dubil et al. | 348/734 |
| 2003/0056215 | A1 * | 3/2003 | Kanungo | 725/38 |
| 2003/0070165 | A1 * | 4/2003 | Houldsworth | 725/25 |
| 2005/0028206 | A1 * | 2/2005 | Cameron et al. | 725/46 |
| 2005/0068151 | A1 * | 3/2005 | Ushida | 340/3.71 |
| 2005/0155057 | A1 | 7/2005 | Wei | |
| 2006/0253874 | A1 * | 11/2006 | Stark et al. | 725/62 |

FOREIGN PATENT DOCUMENTS

| | | |
|---|---|---|
| CN | 1647501 A | 7/2005 |
| JP | 2004-194126 A | 7/2004 |

OTHER PUBLICATIONS

Office Action dated Jun. 1, 2010 issued by the State Intellectual Property Office of P.R. China in Chinese Application No. 200710149627.3.

* cited by examiner

*Primary Examiner* — Jefferey Harold
*Assistant Examiner* — Mustafizur Rahman
(74) *Attorney, Agent, or Firm* — Sughrue Mion, PLLC

(57) ABSTRACT

An image display apparatus and a method for providing an Xlet of the image display apparatus, are provided. The image display apparatus operated by a remote controller having a plurality of function keys, the image display apparatus comprises: an Xlet unit which performs Xlet included in a data broadcast signal; and a display unit which displays the pre-occupied state of the plurality of function keys by the performed Xlet. Accordingly, a user may easily recognize the performed state of the Xlet.

20 Claims, 4 Drawing Sheets

IMAGE DISPLAY APPARATUS AND METHOD FOR PROVIDING XLET THEREOF

CROSS-REFERENCE TO RELATED APPLICATIONS

This application claims priority under 35 U.S.C. §119 from Korean Patent Application No. 2006-115294, filed on Nov. 21, 2006, the entire content of which is incorporated herein by reference.

BACKGROUND OF THE INVENTION

1. Field of the Invention

Apparatuses and methods consistent with the present invention relate to an image display apparatus and a method for providing an Xlet thereof, and more particularly, apparatuses and methods consistent with the present invention relate to an image display apparatus and a method for providing an Xlet thereof, in which a user can easily recognize that the Xlet is being performed.

2. Description of the Related Art

Interactive TV, the use of which has rapidly increased, is a service spotlighted as a leading part of next-generation multimedia, and includes a video on demand, a PC communication service, a multimedia PC, a home shopping function, and a home banking function, in addition to a general TV.

Therefore, the interactive TV receives an additional data broadcast as well as a general broadcast. The additional data broadcast includes an Xlet and the Xlet is configured to preoccupy predetermined function keys of a remote controller.

The Xlet generally refers to a Java application performed in a digital TV set and is a concept similar to a Java applet used in Internet applications.

FIG. 1 is a view showing a general data broadcast receiving state.

Referring to FIG. 1, if a data broadcast is received together with a general broadcast, a message A of "RECEIVING DATA BROADCAST" is displayed on one side of a screen and a user can watch the data broadcast by manipulating a predetermined key for performing a data broadcast in a remote controller.

As shown in FIG. 1, in the state in which a TV 10 is receiving a data broadcast, function keys of a remote controller, which are preoccupied by an Xlet do not perform any operation even when manipulated by a user.

Further, the function keys of the remote controller, which are not preoccupied by the Xlet, such as a color key, channel up/down keys, volume up/down keys, and a power source key, perform their corresponding operations when manipulated by a user.

However, the function keys of the remote controller, which are preoccupied by the Xlet and excludes the color key, the channel up/down keys, the volume up/down keys, and the power source key, and which include number keys, a menu key, and a channel list key, do not perform any operation even when manipulated by the user.

Then, although the message A of "RECEIVING DATA BROADCAST" is displayed on the screen of the TV 10, a user cannot recognize it. In FIG. 1, the message A of "RECEIVING DATA BROADCAST" is shown in the form which can be easily discriminated with the naked eye. However, in almost all the cases, the message A cannot be discriminated from an image of a general broadcast.

Additionally, if the TV 10 is receiving a data broadcast, a user is not able to recognize that some function keys of the remote controller cannot be used. Additionally, it may even be difficult for a user having technical knowledge to recognize that the TV 10 is receiving a data broadcast. Therefore, the user may erroneously believe that there is an error in the TV 10 or the remote controller.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above. Accordingly, it is an aspect of the present invention to provide an image display apparatus and a method for providing an Xlet thereof, which can inform a user of the status of function keys of a remote controller, which is preoccupied by the Xlet, and which can allow a user to recognize that the Xlet is being performed.

The above aspect of the present invention may be substantially realized by providing an image display apparatus operated by a remote controller having a plurality of function keys, the image display apparatus comprising: an Xlet unit which performs an Xlet included in a data broadcast signal; and a display unit which displays a state of a plurality of function keys preoccupied by the performed Xlet.

According to an aspect of the present invention, the image display apparatus may comprise: a control unit which controls the Xlet unit to perform an operation corresponding to an input signal input from the remote controller, if the input signal corresponds to the selection of one of the function keys preoccupied by the Xlet.

According to another aspect of the present invention, the display unit may display a plurality of function keys, which excludes the plurality of function keys preoccupied by the performed Xlet.

According to another aspect of the present invention, the control unit may control the display unit to display the Xlet performed by the Xlet unit, if an input signal corresponds to the selection of one of the function keys preoccupied by the Xlet, which has been set to perform the Xlet.

According to another aspect of the present invention, the control unit may control the display unit to display a message informing a user that the Xlet is being performed, if an input signal corresponding to the selection of one of the function keys preoccupied by the Xlet, which has not been set to perform the Xlet.

According to another aspect of the present invention, the control unit may control the display unit to display the Xlet performed by the Xlet unit, if a visual change of the Xlet is generated by the Xlet unit.

According to another aspect of the present invention, the control unit may control the display unit to display a message informing a user that the Xlet is being performed, if a visual change of the Xlet is not generated by the Xlet unit.

According to another aspect of the present invention, the image display apparatus may further comprise: a screen managing unit which changes a screen in response to a request of the Xlet unit, and the control unit may determine that a visual change of the Xlet is generated, if the screen managing unit calls for a function for use when the screen is changed.

On the other hand, in accordance with another aspect of the present invention, there is provided a method for providing an Xlet of an image display apparatus operated by a remote controller having a plurality of function keys, the method comprising: performing the Xlet included in a data broadcast signal; and displaying a state of the plurality of function keys preoccupied by the performed Xlet.

According to another aspect of the present invention, the method may further comprise: controlling the Xlet to perform an operation corresponding to an input signal input from the remote controller, if the input signal corresponds to the selection of one of the function keys preoccupied by the Xlet.

According to another aspect of the present invention, wherein the state of the plurality of function keys preoccupied by the performed Xlet are displayed by displaying, a plurality of function keys not preoccupied by the performed Xlet.

According to another aspect of the present invention, wherein in the performing the operation corresponding to the input signal, the performed Xlet may be displayed if the input signal corresponds to the selection of one of the function keys preoccupied by the Xlet, which has been set to perform the Xlet.

According to another aspect of the present invention, wherein in the performing the operation corresponding to the input signal, a message informing a user that the Xlet is being performed may be displayed if the input signal corresponds to the selection of one of the function keys preoccupied by the Xlet, which has not been set to perform the Xlet.

According to another aspect of the present invention, wherein in the performing the operation corresponding to the input signal, the performed Xlet may be displayed if a visual change of the Xlet is generated.

According to another aspect of the present invention, wherein in the performing the operation corresponding to the input signal, a message informing a user that the Xlet is being performed may be displayed if a visual change of the Xlet is not generated.

According to another aspect of the present invention, the method may further comprise: calling for a function for use when a screen is changed, and in the performing the operation corresponding to the input signal, it may be determined that a visual change of the Xlet is generated, if the function for use when the screen is changed, is called for.

BRIEF DESCRIPTION OF THE DRAWINGS

The above aspects and features of the present invention will be more apparent by describing certain exemplary embodiments of the present invention with reference to the accompanying drawings, in which.

DETAILED DESCRIPTION OF THE EXEMPLARY EMBODIMENTS

Hereinafter, exemplary embodiments of the present invention will be described in detail with reference to the accompanying drawings.

Figure 2:
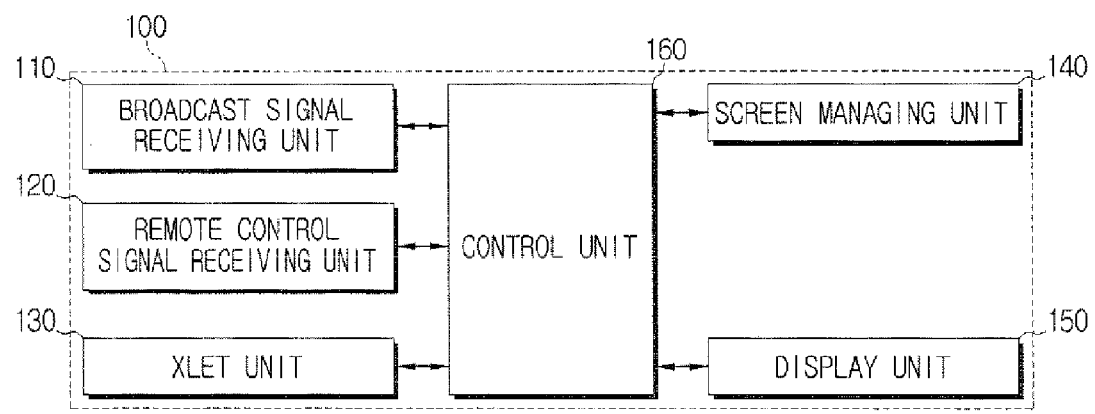
FIG. 2 is a block diagram of an image display apparatus according to an exemplary embodiment of the present invention.

FIG. 2 is a block diagram of an image display apparatus according to an exemplary embodiment of the present invention.

Referring to FIG. 2, the image display apparatus 100 according to the exemplary embodiment of the present invention includes a broadcast signal receiving unit 110, a remote control signal receiving unit 120, an Xlet unit 130, a screen managing unit 140, a display unit 150, and a control unit 160.

The broadcast signal receiving unit 110 receives broadcast signals through an antenna. The broadcast signals received by the broadcast signal receiving unit 110 take the form of a transport stream, and includes general broadcast signals including image signals and voice signals and a data broadcast signal for a data broadcast.

The data broadcast signal provides information separate from a general broadcast, such as traffic information, stock information, and electronic program guide (EPG) information and carries and transfers an Xlet.

The Xlet generally refers to a Java application performed in a digital TV set and is a concept similar to a Java applet used in the Internet.

Additionally, the Xlet may be of an automatic start type or of a manual start type. In the Xlet of a manual start type, a separate Xlet selecting process is necessary differently from an automatic start type Xlet.

The Xlet can preoccupy a predetermined one of function keys of a remote controller. That is, the Xlet can reserve some of the function keys of the remote controller through a middleware. The function keys preoccupied by the Xlet through a reservation do not perform their standard functions, which are typically allocated to the function keys, even if a user manipulates the function keys.

The function keys of a remote controller, which are preoccupied by an Xlet, may be different. However, some of the plurality of function keys provided in the remote controller, such as channel up/down keys, volume up/down keys, and a power key, may be reserved so as not to be preoccupied by the Xlet.

Since the broadcast signals received at the broadcast receiving unit 110 have been modulated using a transmitter (not shown) to transfer the broadcast signals, a process such as a demodulation may be necessary in the image display apparatus 100. This process is well known in the prior art, thus, a detailed description will be omitted.

The remote control signal receiving unit 120 receives an input signal for controlling the operation of the image display apparatus 100 by manipulation of a user. The remote controller includes a plurality of function keys and transfers an input signal according to selection of a function key to the image display apparatus 100.

The Xlet unit 130 performs the Xlet included in the data broadcast signal of the broadcast being received at the broadcast receiving unit 110. The Xlet unit 130 is a unit for managing all the Xlets received at the image display apparatus and may contain information on all the Xlets.

After performing the Xlet, the Xlet unit 130 informs the control unit 160 of those of the plurality of function keys included in the remote controller, which are preoccupied by the Xlet. Through this, a user can be informed of those function keys not preoccupied by the Xlet and that remain in a normal usable state.

The screen managing unit 140 changes the screen according to a request of the Xlet unit 130. The screen managing unit 140 can regulate the size of the screen and change graphics by calling for a function for use when the screen is changed such as "show", "move", and "hide" in home audio/video interoperability (HAVI). The Xlet performed by the Xlet unit 130 can be displayed on the display unit 150 according to the screen change of the screen managing unit 140.

The display unit 150 displays the general broadcast signals received at the broadcast signal receiving unit 110 and the Xlet performed in the Xlet unit 130 under the control of the control unit 160 so that a user can watch them.

Figure 1:
FIG. 1 is a view showing a general data broadcast receiving state in the related art.

If the Xlet unit 130 performs the Xlet, as exemplified in FIG. 1, the display unit 150 can display a message A of "RECEIVING DATA BROADCAST" informing a user that the Xlet is being performed, on one side of the screen.

Additionally, the display unit 150 can display the preoccupied state of the function keys of the remote controller by the Xlet performed by the Xlet unit 130. In an exemplary embodiment, the display unit 150 can display those of the plurality of function keys included in the remote controller, which excludes the function keys preoccupied by the Xlet performed by the Xlet unit 130, in the form which can be easily recognized by a user.

In this exemplary embodiment, the case in which the display unit 150 displays those function keys excluding the function keys preoccupied by the Xlet, i.e. those function keys not preoccupied by the Xlet, is exemplified. However, the present invention is not limited thereto. For example, the display unit may display those function keys preoccupied by the Xlet. A user can be informed of the mode of implementation through a user's manual.

The control unit 160 controls the overall functions of the image display apparatus 100, and controls a signal input/output between the broadcast signal receiving unit 110, the remoter control signal receiving unit 120, the Xlet unit 130, the screen managing unit 140, and the display unit 150.

If an input signal corresponding to a selection of the function keys of the remote controller, which are preoccupied by the Xlet, is input through the remote control signal receiving unit 120, the control unit 160 controls the image display apparatus to perform an operation corresponding to the input signal input from the Xlet unit 130.

The Xlet preoccupies predetermined function keys of the plurality of function keys included in the remote controller, but some of the preoccupied function keys may only be preoccupied and not capable of performing any function.

For example, an input signal for performing the Xlet can be generally set to be input by selection of a red key included in the remote controller and number keys for 0 to 9, a menu key, and a channel list key can be set so as to be preoccupied only by the Xlet, but not capable of performing other functions.

In this case, although the Xlet is performed and the screen is changed if the red key of the remote controller is manipulated by a user, because no reaction is generated even by manipulating one of the number keys for 0 to 9, the menu key, and the channel list key, a user may mistakenly think that an error is generated in the image display apparatus 100 or the remote controller 300.

Therefore, this exemplary embodiment of the present invention displays a message so that a user can be informed that the Xlet is being performed if the user manipulates one of the number keys for 0 to 9, the menu key, and the channel list key. For this, the control unit 160 performs the following functions.

The control unit 160 controls the display unit 150 to display the Xlet performed by the Xlet unit 130 if an input signal according to selection of a function key preoccupied by the Xlet, which is set to perform the Xlet, is input.

On the other hand, the control unit 160 controls the display unit 150 to display a message informing a user that the Xlet is being performed if an input signal according to selection of a function key preoccupied by the Xlet, which is not set to perform the Xlet, is input.

Additionally, the control unit 160 controls the display unit 150 to display the Xlet performed by the Xlet unit 130 if a visual change of the Xlet is generated by the Xlet unit 130.

On the other hand, the control unit 160 controls the display unit 150 to display a message informing a user that the Xlet is being performed if a visual change of the Xlet is not generated by the Xlet unit 130. Then, the control unit 160 determines that a visual change of the Xlet is generated, if a function for use when the screen is changed, is called for in the screen managing unit 140.

As mentioned above, this exemplary embodiment of the present invention exemplifies the case in which the image display apparatus 100 includes the broadcast signal receiving unit 110, the remote control signal receiving unit 120, the Xlet unit 130, the screen managing unit 140, the display unit 150, and the control unit 160. However, the present invention is not limited thereto.

For example, the image display apparatus 100 may include only the Xlet unit 130 performing the Xlet contained in the data broadcast signal and the display unit which displays the preoccupied state of the plurality of function keys by the Xlet performed by the Xlet unit 130.

Figure 3:
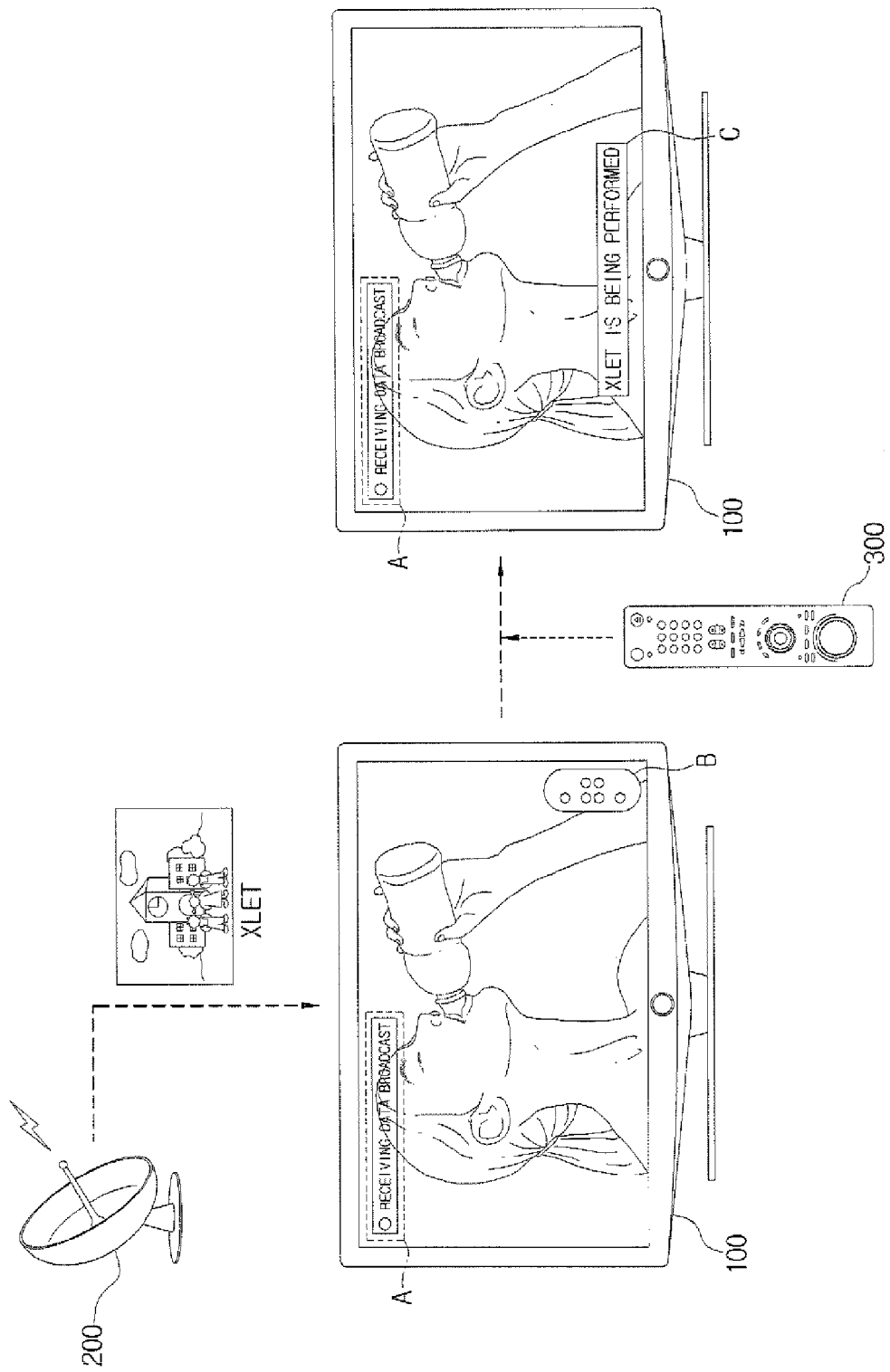
FIG. 3 is a view showing a data broadcast receiving state according to an exemplary embodiment of the present invention.

FIG. 3 is a view showing a data broadcast receiving state according to an exemplary embodiment of the present invention.

Broadcast signals including general broadcast signals and a data broadcast signal and taking the form of a transfer stream are transmitted from an antenna 200 to the image display apparatus 100. The data broadcast signal includes an Xlet.

A message A of "RECEIVING DATA BROADCAST" is displayed on the display unit 150 of the image display apparatus 100 together with the general broadcast signals. As shown in FIG. 3, since the message A of "RECEIVING DATA BROADCAST" is mixed with another image when displayed on the display unit 150, a user cannot easily recognize it.

Additionally, a list B of the function keys of the remote controller, which are in a usable state, is displayed on the display unit 150 of the image display apparatus 100. In FIG. 3, the list B of the function keys in a usable state are briefly shown, but a user can change the usable function keys into an easily recognizable form.

Because the list B of the function keys in the usable state can become an obstruction factor in watching TV, it may be set to display only for a predetermined period of time before it disappears.

Thereafter, if a function key, which is preoccupied by the Xlet but is not set to perform the Xlet, i.e. one of the number keys for 0 to 9, the menu key, and the channel list key is manipulated using the remote controller 300, the control unit controls the display unit 150 to display a message informing a user that the Xlet is being performed, i.e. a message C of "XLET IS BEING PERFORMED".

The message C of "XLET IS BEING PERFORMED" is an example of a message informing a user that the Xlet is being performed and a user can change the expression and the displayed area into an easily recognizable form.

A user can be informed that the function key manipulated using the remote controller cannot perform the corresponding function, by displaying the message informing the user that the Xlet is being performed on the display unit 150.

Figure 4:
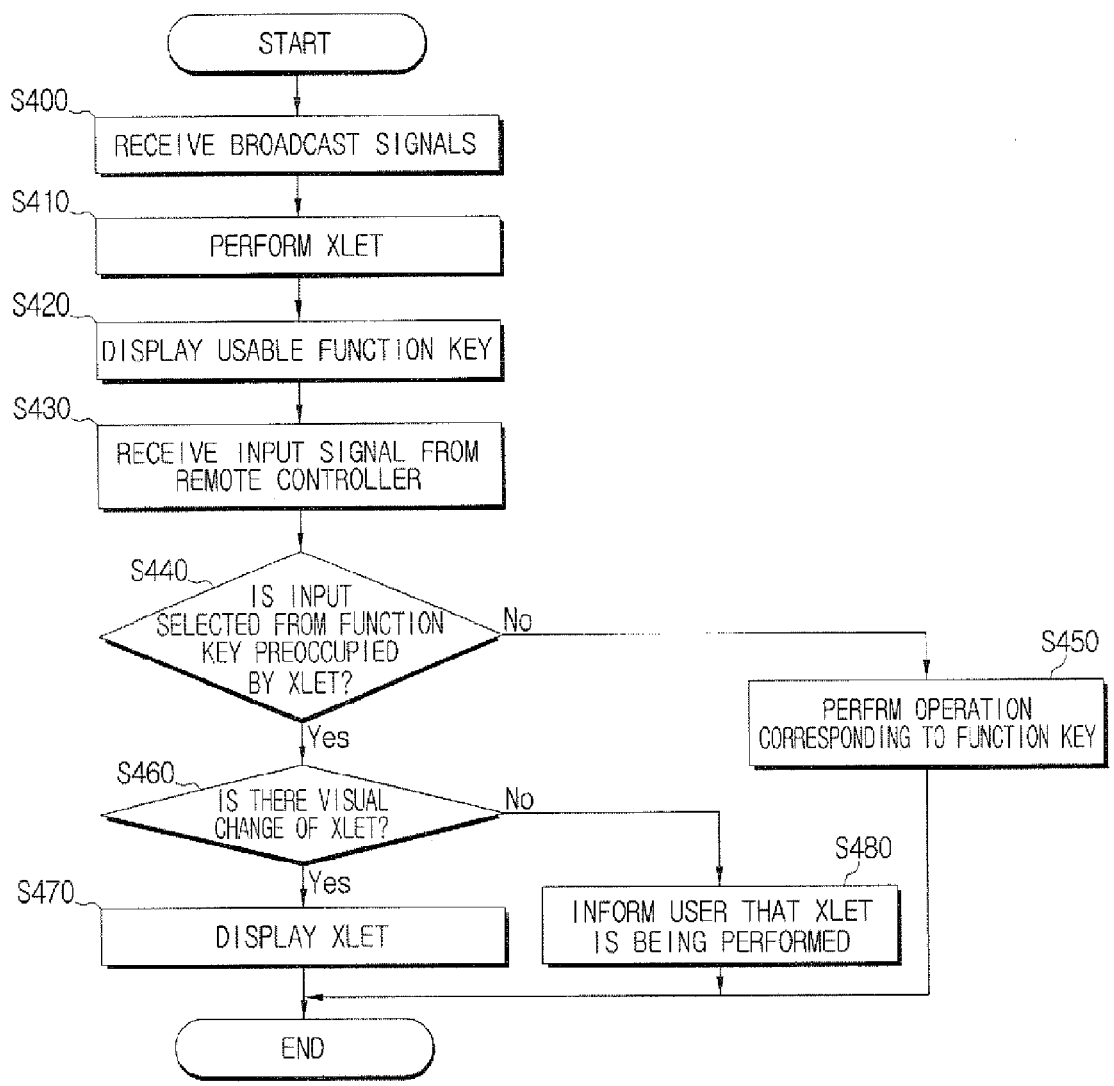
FIG. 4 is a flow chart for explaining a method for providing an Xlet of an image display apparatus according to an exemplary embodiment of the present invention.

FIG. 4 is a flow chart for explaining a method for providing an Xlet of an image display apparatus according to an exemplary embodiment of the present invention.

Hereinafter, the method for providing an Xlet of the image display apparatus according to an exemplary embodiment of the present invention will be described with reference to FIGS. 2 to 4.

The broadcast signal receiving unit 110 receives broadcast signals from the antenna 200. Here, the broadcast signals include general broadcast signals and a data broadcast signal and the data broadcast signal contains an Xlet (S400).

The Xlet contained in the data broadcast signal of the broadcast signals received through the broadcast signal receiving unit 110 is performed by the Xlet unit 130. Then, the Xlet preoccupies predetermined function keys of the remote controller 300 using a Java middleware (S410).

After performing the Xlet, the Xlet unit 130 informs the control unit 160 of the function keys of the remote controller 300, which are preoccupied by the Xlet, and the control unit 160 controls the display unit 150 to display the preoccupied state of the function keys of the remote controller 300 by the Xlet, i.e. displaying function keys of the remote controller 300 remaining in a normal usable state, which excludes the function keys preoccupied by the Xlet. These function keys, which exclude the function keys preoccupied by the Xlet, are those which can be used by a user even when the Xlet is performing (S420).

If the remote controller 300 is manipulated by a user in the state in which the Xlet is being performed, i.e. in the state in which the data broadcast is being received, the remote control signal receiving unit 120 receives an input signal from the remote controller 300 (S430).

The control unit 160 determines whether the input signal received through the remote control signal receiving unit 120 corresponds to a function key preoccupied by the Xlet (S440).

In operation S440, in the case in which the input signal received through the remote control receiving unit 120 corresponds to a function key preoccupied by the Xlet (S440-Y), the control unit 160 determines whether a visual change of the Xlet has been generated. The determination of the visual change of the Xlet can be determined according to whether or not a function for use when the screen is changed, has been called for by the screen managing unit (S460).

If the input signal received through the remote control signal receiving unit 120 does not correspond to a function key preoccupied by the Xlet (S440-N) in operation S440, the control unit 160 controls the image display apparatus to perform an operation corresponding to the input function key, like an operation of a general remote controller 300 (S450).

In operation S460, if it is determined that a visual change of the Xlet has been generated (S460-Y), the control unit 160 controls the display unit 150 to display the Xlet. When the Xlet is displayed on the display unit 150, the screen is changed by the screen managing unit 140 to be displayed (S470).

In operation S460, if it is determined that a visual change of the Xlet has not been generated (S460-N), the control unit 160 controls the display unit 150 to display a message informing a user that the Xlet is being performed (S480).

Figure 5:
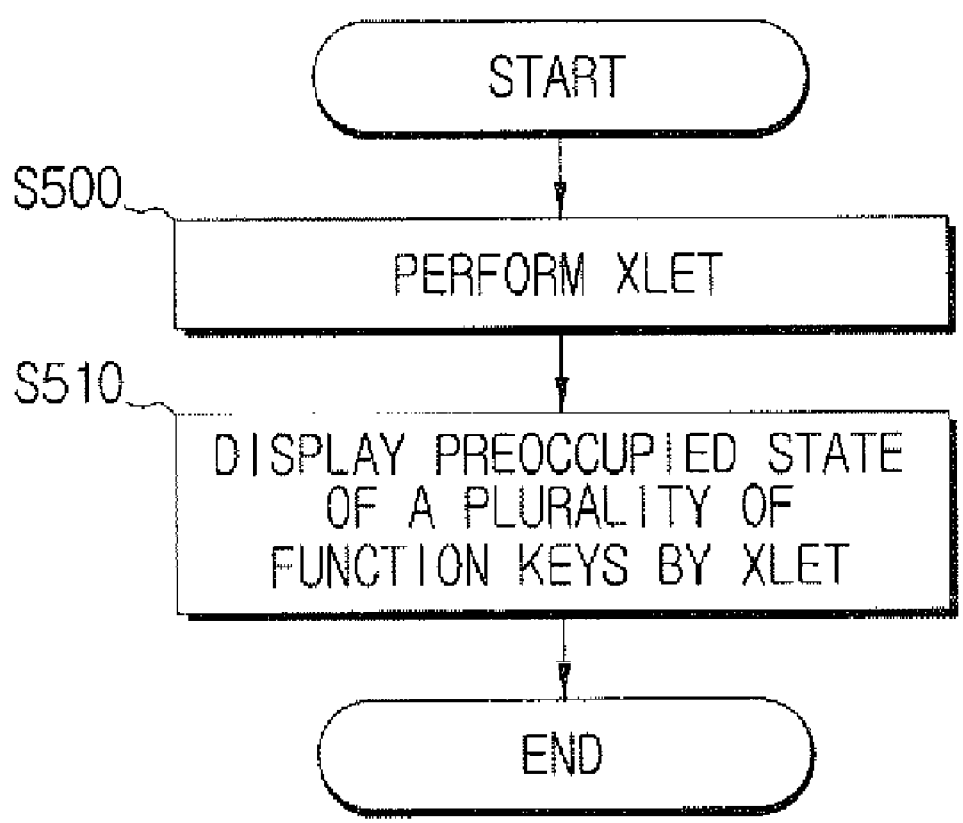
FIG. 5 is a flow chart for explaining a method for providing an Xlet of an image display apparatus according to another exemplary embodiment of the present invention.

FIG. 5 is a flow chart for explaining a method for providing an Xlet of an image display apparatus according to another exemplary embodiment of the present invention.

If the image display apparatus 100 receives a data broadcast signal containing an Xlet through the broadcast signal receiving unit 110, the Xlet unit 130 performs the Xlet received through the broadcast signal receiving unit (S500).

The Xlet preoccupies some of a plurality of function keys and the display unit 150 displays the preoccupied state of the plurality of function keys by the Xlet under the control of the control unit 160 (S510).

Through the processes of FIGS. 4 and 5, the display unit 150 can display not only a conventional message A of "RECEIVING DATA BROADCAST" but also a list of function keys of the remote controller 300 which are in a usable state and a message C of "XLET IS BEING PERFORMED". Accordingly, even a user not familiar with a data broadcast provided separately from a general broadcast may easily use the data broadcast.

As mentioned above, the image display apparatus and the method for providing an Xlet of the image display apparatus according to the exemplary embodiments of the present invention may inform a user of function keys usable in a remoter controller and may allow the user to manipulate only the usable function keys, by displaying the function keys usable in the remote controller when the data broadcast is being received.

Additionally, if a user manipulates a function key of the remote controller which is preoccupied by the Xlet and cannot be used in a normal fashion, a user may be prevented from misunderstanding the case as an operation error of the image display apparatus or the remoter controller by informing the user that the Xlet is being performed in a form which can be easily recognized by the user.

Although exemplary embodiments of the present invention have been shown and described, it would be appreciated by those skilled in the art that the present invention is not limited to those exemplary embodiments and various modifications might be made without departing from the essence of the invention, which is claimed in the claims, and the modifications should not be understood separately from the sprit and prospect of the present invention.

What is claimed is:

1. An image display apparatus operated by a remote controller having a plurality of function keys, the image display apparatus comprising:
    an Xlet unit which performs an Xlet included in a data broadcast signal; and
    a display unit which displays a state of a plurality of function keys preoccupied by the performed Xlet among the plurality of function keys,
    wherein the function keys which are preoccupied by the Xlet are operable only for the Xlet.

2. The image display apparatus as claimed in claim 1, further comprising:
    a control unit which controls the Xlet unit to perform an operation corresponding to an input signal input from the remote controller, if the input signal corresponds to a selection of one of the function keys preoccupied by the Xlet.

3. The image display apparatus as claimed in claim 1, wherein the display unit displays a plurality of function keys, which excludes the plurality of function keys preoccupied by the performed Xlet.

4. The image display apparatus as claimed in claim 2, wherein the control unit controls the display unit to display the Xlet performed by the Xlet unit, if an input signal corresponds to the selection of the at least one of the function keys preoccupied by the Xlet, which has been set to perform the Xlet.

5. The image display apparatus as claimed in claim 2, wherein the control unit controls the display unit to display a message informing a user that the Xlet is being performed, if an input signal corresponds to the selection of one of the function keys preoccupied by the Xlet, which has not been set to perform the Xlet.

6. The image display apparatus as claimed in claim 2, wherein the control unit controls the display unit to display the Xlet performed by the Xlet unit, if a visual change of the Xlet is generated by the Xlet unit.

7. The image display apparatus as claimed in claim 2, wherein the control unit controls the display unit to display a message informing a user that the Xlet is being performed, if a visual change of the Xlet is not generated by the Xlet unit.

8. The image display apparatus as claimed in claim 6, further comprising:
   a screen managing unit which changes a screen in response to a request of the Xlet unit,
   wherein the control unit determines that a visual change of the Xlet is generated, if the screen managing unit calls for a function for use when the screen is changed.

9. A method for providing an Xlet of an image display apparatus operated by a remote controller having a plurality of function keys, the method comprising:
   performing the Xlet included in a data broadcast signal; and
   displaying a state of a plurality of function keys preoccupied by the performed Xlet among the plurality of function keys,
   wherein the function keys which are preoccupied by the Xlet are operable only for the Xlet.

10. The method as claimed in claim 9, the method further comprising:
    controlling the Xlet to perform an operation corresponding to an input signal input from the remote controller, if the input signal corresponds to a selection of one of the function keys preoccupied by the Xlet.

11. The method as claimed in claim 9, wherein the state of the plurality of function keys preoccupied by the performed Xlet is displayed by only displaying a plurality of function keys not preoccupied by the performed Xlet.

12. The method as claimed in claim 10, wherein in the performing the operation corresponding to the input signal, the performed Xlet is displayed if the input signal corresponds to the selection of one of the function keys preoccupied by the Xlet, which has been set to perform the Xlet.

13. The method as claimed in claim 10, wherein in the performing the operation corresponding to the input signal, a message informing a user that the Xlet is being performed is displayed if the input signal corresponds to the selection of one of the function keys preoccupied by the Xlet, which has not been set to perform the Xlet.

14. The method as claimed in claim 10, wherein in the performing the operation corresponding to the input signal, the performed Xlet is displayed if a visual change of the Xlet is generated.

15. The method as claimed in claim 10, wherein in the performing the operation corresponding to the input signal, a message informing a user that the Xlet is being performed is displayed if a visual change of the Xlet is not generated.

16. The method as claimed in claim 14, the method further comprising:
    calling for a function for use when a screen is changed,
    wherein, in performing the operation corresponding to the input signal, it is determined that the visual change of the Xlet is generated, if the function for use when the screen is changed, is called for.

17. The image display apparatus according to claim 1, wherein the image display apparatus is located separately from the remote controller.

18. The image display apparatus according to claim 1, wherein the Xlet is one of an automatic start type and a manual start type.

19. The image display apparatus according to claim 1, wherein the Xlet unit manages Xlets received at the image display apparatus and contains information on the Xlets.

20. The image display apparatus according to claim 1, wherein the display unit displays the state of the plurality of functions keys of the remote controller for a predetermined period of time while a general broadcast is viewed on the image display apparatus.

\* \* \* \* \*